(12) United States Patent
Banon (10) Patent No.: US 9,917,453 B1
(45) Date of Patent: Mar. 13, 2018

(54) UNITARY WALL OUTLET CHARGING STATION

(71) Applicant: PERLE TECHNOLOGIES INC, Fort Lauderdale, FL (US)

(72) Inventor: Stephanie Esther Banon, Ft. Lauderdale, FL (US)

(73) Assignee: Perle Technologies, Inc., Fort Lauderdale, FL (US)

( * ) Notice: Subject to any disclaimer, the term of this patent is extended or adjusted under 35 U.S.C. 154(b) by 0 days.

(21) Appl. No.: 15/378,691

(22) Filed: Dec. 14, 2016

(51) Int. Cl.
*H02J 7/00* (2006.01)
*H02J 7/02* (2016.01)

(52) U.S. Cl.
CPC .......... *H02J 7/0042* (2013.01); *H02J 7/0052* (2013.01); *H02J 7/022* (2013.01); *H02J 2007/0062* (2013.01)

(58) Field of Classification Search
CPC ........ H02J 7/007; H02J 7/0047; H02J 7/0045; H02J 7/0027; H02J 7/0055; H02J 7/0042; H01R 13/6675; H01R 13/72; H01R 31/02; H01R 31/06; H01R 31/065; H02G 11/02
USPC .................. 320/114, 115, 111, 107
See application file for complete search history.

(56) References Cited

U.S. PATENT DOCUMENTS

| | | | |
|---|---|---|---|
| 5,494,446 A * | 2/1996 | DeLucia | H02G 11/02 439/4 |
| 5,679,925 A | 10/1997 | Dilley | |
| 5,923,147 A | 7/1999 | Martensson | |
| 6,059,081 A | 5/2000 | Patterson | |
| 6,127,803 A | 10/2000 | Wang | |
| 6,416,355 B1 * | 7/2002 | Liao | H01R 13/6658 439/164 |
| 6,433,274 B1 * | 8/2002 | Doss | H01R 13/72 174/50 |
| 6,478,587 B2 | 11/2002 | Sharples | |
| 6,806,682 B2 | 10/2004 | Hsiao | |
| 6,874,632 B2 | 4/2005 | Thiessen | |
| 7,151,356 B1 | 12/2006 | Chen | |
| 7,510,426 B2 | 3/2009 | Hwang | |
| 7,997,925 B2 | 8/2011 | Lam | |
| 8,794,997 B2 | 8/2014 | Tin | |
| 8,802,991 B1 * | 8/2014 | Hua | H01R 31/065 174/133 R |
| 8,851,909 B2 | 10/2014 | Shammoh | |
| 9,153,986 B1 | 10/2015 | Herr | |

(Continued)

FOREIGN PATENT DOCUMENTS

WO 2016036328 3/2016

*Primary Examiner* — David V Henze-Gongola
(74) *Attorney, Agent, or Firm* — Johnson | Dalal; Mark C. Johnson (57) ABSTRACT

A unitary wall outlet charging station for charging portable electronic devices including a unitary unitary wall outlet plug body operably configured to be removeably plugged into a wall outlet disposed on a building wall, the unitary unitary wall outlet plug body having an inner surface of each of a front face, a rear face, a first sidewall, and a second sidewall defining a cavity; a set of wall outlet plugs extending outwardly from the rear face; and a wall outlet disposed on the front face. The unitary wall outlet charging station further includes a pair of retractable cables each having a connector coupled to an end thereof and each disposed within the cavity in a retracted configuration and outside of the cavity in an extended configuration.

19 Claims, 5 Drawing Sheets

(56) References Cited

U.S. PATENT DOCUMENTS

2010/0075540 A1* 3/2010 Liao ................. H01R 13/60
                                                    439/638
2015/0295438 A1* 10/2015 Herr .................. H02J 7/0044
                                                    320/111

* cited by examiner

UNITARY WALL OUTLET CHARGING STATION

FIELD OF THE INVENTION

The present invention relates generally to charging stations, and, more particularly, relates to a unitary wall outlet charging station that removeably plugs into a wall outlet of a building and also provides retractable charging cables for charging portable electronic devices.

BACKGROUND OF THE INVENTION

It is well-known that portable electronic devices, such as smartphones, tablets, laptops, portable audio players, and the like, are ubiquitous in present day society. One primary problem associated with portable electronic devices is providing sufficient power to the battery so that such portable devices are operable, even when not directly coupled to a power source. As is generally known, consumers are known to constantly charge their portable devices whenever there is a source available. Typically, users require a charging cable with a connector. The connector is configured to couple to a charging port on their electronic devices. It is also known that users often find themselves in situations in which they are not able to locate the charging cable and connector that is configured for the particular charging port on their particular electronic device (because different devices are configured with different types of charging ports). Because charging cables and connectors are relatively small, they are easily misplaced. Also, users are known to often find themselves without power, or with very low power on their electronic devices, yet without a compatible charging cable and connector accessible to them, which can be very frustrating.

Further, the number of conventional wall outlets disposed on building walls are often lacking. To elaborate, because most homes, offices, business, etc. utilize a multitude of electronic devices, often the number of conventional wall outlets available for these electronic devices is insufficient. Existing solutions for these problems are lacking.

Charging stations are known which provide a multitude of ports for charging portable electronic devices. However, there is still a problem that users are sometimes not able to locate, or do not otherwise have immediate access to the charging cable and connector required for their particular electronic device(s). Accordingly, such users would not be able to use the charging station to charge their devices without being able to locate or acquire the compatible charging cable and connector.

In addition, charging stations are often bulky, not pleasing in appearance, and are configured with complicated designs that drive up the manufacturing costs associated with the charging station. Charging stations are often required to be placed on a desk or other flat surface, taking up space on the desk or other surface, having a lengthy non-adjustable power cord that takes us space, and/or generally lacking in ease of portability for charging on-the-go.

Therefore, a need exists to overcome the problems with the prior art as discussed above.

SUMMARY OF THE INVENTION

The invention provides a unitary wall outlet charging station that overcomes the hereinafore-mentioned disadvantages of the heretofore-known devices and methods of this general type.

With the foregoing and other objects in view, there is provided, in accordance with the invention, a unitary wall outlet charging station for charging portable electronic devices is disclosed that includes a unitary wall outlet plug body operably configured to be removeably plugged into a wall outlet disposed on a building wall, wherein the unitary wall outlet plug body has a front wall, a rear wall opposite the front wall, a first sidewall separating the front wall from the rear wall, and defining a first sidewall aperture, a second sidewall opposite the first sidewall, separating the front wall from the rear wall, and defining a second sidewall aperture, an inner surface of each of the front wall, the rear wall, the first sidewall, and the second sidewall defining a cavity, a set of wall outlet plugs extending outwardly from the rear wall, and a wall outlet provided on the front wall and operably configured to selectively receive a second set of wall outlet plugs associated with an electrical device for supplying power to the electrical device. The device also includes a first retractable cable with a first connector coupled to an end of the first retractable cable, a retracted configuration along a first cable path with the first retractable cable at least partially disposed within the cavity so as to be visually concealed within the unitary wall outlet plug body, and an extended configuration along the first cable path with the first retractable cable rotatably extended outwardly, at a selectively adjustable distance from the first sidewall, into an external environment through the first sidewall aperture such that the first connector is couplable to a charging port of a first portable electronic device. The device also includes a second retractable cable having a second connector coupled to an end of the second retractable cable, a retracted configuration along a second cable path with the second retractable cable at least partially disposed within the cavity so as to be visually concealed within the unitary wall outlet plug body, and an extended configuration along the second cable path with the second retractable cable rotatably extended outwardly, at a selectively adjustable distance from the first sidewall, into an external environment through the second sidewall aperture such that the second connector is couplable to a charging port of a second portable electronic device.

In accordance with a further feature of the present invention, the second connector is of a different connector type than the first connector.

In accordance with an additional feature of the present invention, each of the first and second retractable cables have a cable length that is at least four (4) feet and each of the first and second retractable cables are independently rotatable relative to one another.

In accordance with yet another feature of the present invention, the unitary wall outlet plug body is of a non-uniform thickness having a first portion in which the first and second retractable cables are disposed that is of a greater thickness than a thickness of a second portion of the unitary wall outlet plug body in which the wall outlet provided on the front wall is disposed.

In accordance with a feature of the present invention, the first sidewall defines a first sidewall recess within which at least a portion of the first connector is disposed in the retracted configuration of the first retractable cable and the second sidewall defines a second sidewall recess within which at least a portion of the second connector is disposed in the retracted configuration of the second retractable cable.

In accordance with a further feature of the present invention, the first sidewall recess is sized and shaped to receive at least one finger of a user so as to permit the user to grip the first connector to outwardly extend the first retractable cable in a first direction parallel to the wall when the unitary wall outlet plug body is plugged into the wall outlet disposed on the building wall and the second sidewall recess is sized and shaped to receive at least one finger of the user so as to permit the user to grip the second connector to outwardly extend the second retractable cable in a second direction parallel to the wall when the unitary wall outlet plug body is plugged into the wall outlet disposed on the building wall, the second direction opposite the first direction.

In accordance with another feature of the present invention, the wall outlet provided on the front wall is the only wall outlet disposed on the unitary wall outlet charging station.

In accordance with another feature, an embodiment of the present invention includes a pair of co-axial spools each independently rotatable relative to one another about an axis perpendicular to the wall when the unitary wall outlet plug body is plugged into the wall outlet disposed on the wall of the building and wherein each of the pair of co-axial spools are disposed to receive a respective one of the first and second retractable cables thereon.

In accordance with another feature of the present invention, the unitary wall outlet plug body is adapted to resemble (e.g., in size and shape) a standard wall outlet face plate.

In accordance with another feature of the present invention, the unitary wall outlet plug body is sized and shaped so as to conceal a standard wall outlet face plate disposed on the front wall from a front view of a viewer when the unitary wall outlet plug body is plugged into the wall outlet disposed on the building wall.

In accordance with yet another feature of the present invention, the unitary wall outlet plug body further also includes a top wall separating the first sidewall from the second sidewall and a bottom wall opposite the top wall and separating the first sidewall from the second sidewall, the top and bottom walls having a flat, protrusion-free external surface extending continuously from the first sidewall to the second sidewall.

In accordance with another feature of the present invention, the unitary wall outlet plug body, the first retractable cable, the first connector, the second retractable cable, the second connector, and all of the electrical and mechanical support elements disposed on and within the unitary wall outlet plug body together defines a charging station weight that is configured to be sufficient to be retained, without any other support forces, on the wall solely by the set of wall outlet plugs when the unitary wall outlet plug body is plugged into the wall outlet disposed on the building wall.

In accordance with the present invention, a unitary wall outlet charging station has also been disclosed that includes a unitary wall outlet plug body operably configured to be removeably plugged into a wall outlet disposed on a building wall, wherein the unitary wall outlet plug body has a front wall, a rear wall opposite the front wall, a first sidewall separating the front wall from the rear wall and defining a first sidewall aperture, a second sidewall opposite the first sidewall, separating the front wall from the rear wall, and defining a second sidewall aperture, an inner surface of each of the front wall, the rear wall, the first sidewall, and the second sidewall defining a cavity, a set of wall outlet plugs extending outwardly from the rear wall, and a wall outlet provided on the front wall and operably configured to selectively receive a second set of wall outlet plugs associated with an electrical device for supplying power to the electrical device. The device also includes a pair of retractable cables that are independently rotatable relative to one another, each having a connector coupled to an end thereof, each disposed within the cavity in a retracted configuration thereof and at least a portion of the respective retractable cable disposed in an external environment in an extended configuration thereof, each rotatably extendable into the external environment through one of the first and second sidewall apertures such that the respective connector is couplable to a mating charging port of a portable electronic device at a selectively adjustable distance from the unitary wall outlet plug body, and each having a cable length configured such that the respective selectively adjustable distance is at least three (3) feet.

Although the invention is illustrated and described herein as embodied in a unitary wall outlet charging station, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the unitary wall outlet plug body from a top end to a bottom end.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient unitary wall outlet charging station. Embodiments of the invention provide a unitary wall outlet plug body having a set of wall outlet plugs extending outwardly from a rear face of the body so as to be removeably plugged into a wall outlet disposed on a building wall and a wall outlet disposed on the front face of the body so as to be operable to receive a set of wall outlet plugs from a power cord of an electronic device. In addition, embodiments of the invention provide for the unitary wall outlet charging station to include a pair of retractable charging cables and connectors for charging portable electronic devices at a selectively adjustable distance from the building wall outlet. In other embodiments, the unitary wall outlet plug body is shaped to resemble a standard wall outlet face plate so as to visually blend into the existing wall layout without giving the appearance of an eyesore. In other words, in some embodiments, when the inventive unitary wall outlet charging station is coupled to the wall outlet of the building wall, it generally gives the appearance of a conventional wall outlet and does not take up a large amount of additional space proximate the wall so as to not obstruct placement of furniture disposed proximate the wall.

Figure 1:
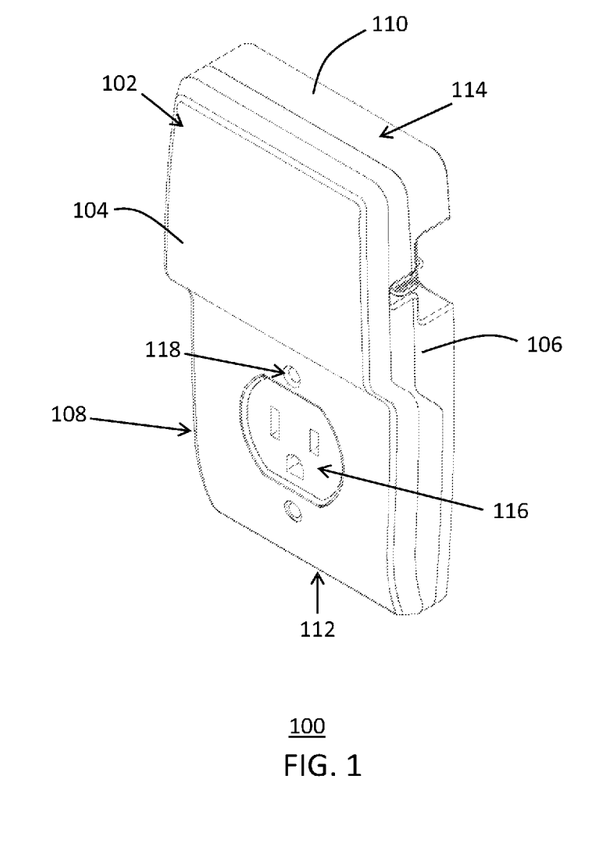
FIG. 1 is a perspective downward-looking front view of a unitary wall outlet charging station in accordance with an embodiment of the present invention.

Referring now to FIG. 1, one embodiment of the present invention is shown in a front downward-looking perspective view. FIG. 1 shows several advantageous features of the present invention, but, as will be described below, the invention can be provided in several shapes, sizes, combinations of features and components, and varying numbers and functions of the components. The first example of unitary wall outlet charging station 100, as shown in FIG. 1, includes a unitary wall outlet plug body 102 operably configured to be removeably plugged into a wall outlet 700 disposed on a building wall 702 (see FIG. 7). As used herein, the term "building" is intended broadly to encompass any structure designed to house at least one person for residential, commercial, and other purposes and typically including a roof portion and walls, such as, for example, a house, a room, an office, a school, a store, a factory, and the like. Moreover, the body 102 is removable in that it can be quickly and efficiently removed from the wall junction box, e.g., by simply removing one or more fasteners and/or unplugging the body 102, as opposed to those known devices integrated into the junction box and/or wall.

Figure 2:
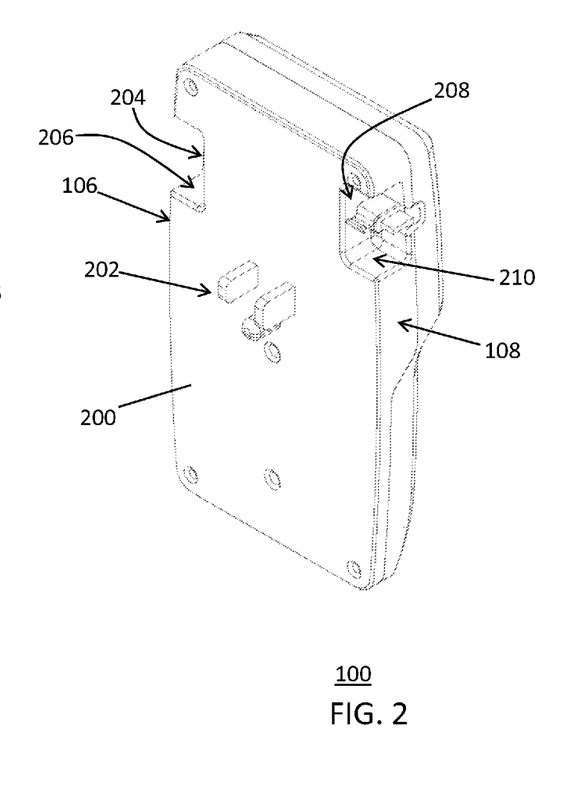
FIG. 2 is a perspective downward-looking rear view of the unitary wall outlet charging station of FIG. 1 in accordance with the present invention.

Referring now to FIGS. 1 and 2, in one embodiment, the unitary wall outlet plug body 102 includes a front wall 104 and a rear wall 200. In a further embodiment, the front wall 104 may be opposite the rear wall 200. The unitary wall outlet plug body 102 may also include a first sidewall 106 and a second sidewall 108. In one embodiment, the first sidewall 106 and the second sidewall 108 may be considered to separate the front wall 104 from the rear wall 200. In a further embodiment, the second sidewall 108 may be opposite the first sidewall 106. In another embodiment, the unitary wall outlet plug body 102 includes a top wall 110 and a bottom wall 112. In one embodiment, the top wall 110 and the bottom wall 112 may be considered to separate the first and second sidewalls 106 and 108. In other words, the sidewalls 106 and 108 may be disposed between the top and bottom walls 110 and 112. In a further embodiment, the top wall 110 is opposite the bottom wall 112. In other embodiments, the front wall 104, rear wall 200, sidewalls 106 and 108, and top and bottom walls 110 and 112 may be disposed and oriented in other configurations with respect to one another. It should be understood that terms such as, "front," "rear," "side," "top," "bottom," and the like are indicated from the reference point of a viewer viewing the unitary wall outlet charging station 100 from its front wall 104 when the station 100 is plugged into the wall outlet 700 disposed on the building wall 702 (see FIG. 7).

In some embodiments, the walls 104, 200, 106, 108, 110, and 112 can be said to together define a housing and support structure for components disposed within and on the unitary wall outlet plug body 102, as will be discussed in more detail herein below. More particularly, as can be seen with reference to FIGS. 1-3, in one embodiment, an inner surface 300 of each of the front wall 104, the rear wall 200, the first sidewall 106, the second sidewall 108, the top wall 110, and the bottom wall 112 defines a cavity 302. Said another way, all of the walls may encapsulate the cavity 302 (excluding any apertures for outlet members/plugs and for connectors). The cavity 302 can be said to provide a storage area for the components disposed within the unitary wall outlet plug body 102.

As used herein, the term "wall" is intended broadly to encompass continuous structures, as well as, separate structures that are coupled together so as to form a substantially continuous external surface. As an example, in FIGS. 1 and 5, it can be seen that in the exemplary embodiment the sidewall 106 actually includes a portion of a front shell, a portion of a rear shell, and a portion of an intermediate shell that together form the sidewall 106.

Figure 7:
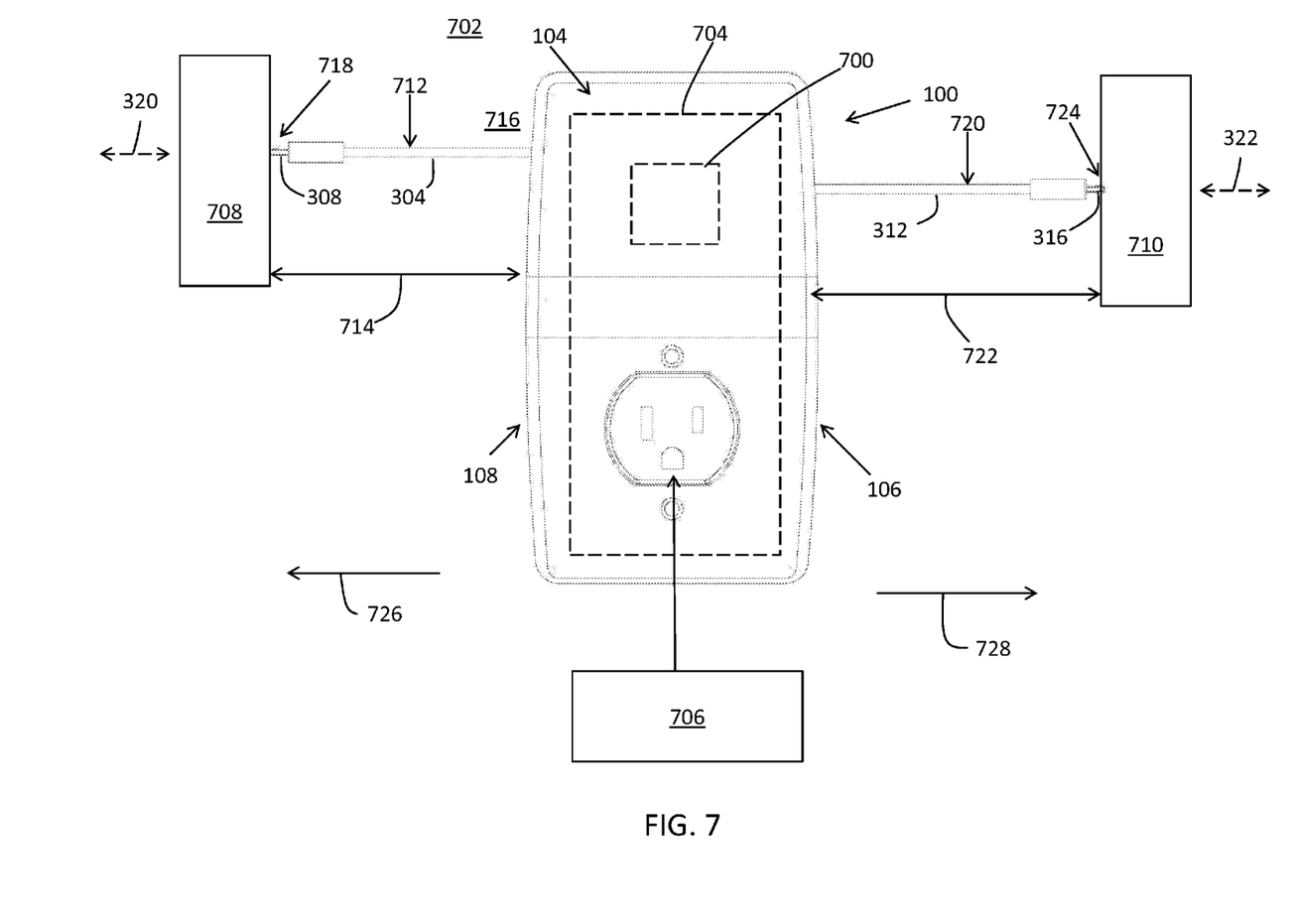
FIG. 7 is an elevational front view of the unitary wall outlet charging station of FIG. 1, shown plugged into a standard wall outlet disposed on a building wall.

Referring now to FIGS. 1 and 7, in one embodiment, all or a portion of the walls 104, 200, 106, 108, 110, and 112 may be of a plastic material, or other polymer-based material. In other embodiments, all or a portion of the walls 104, 200, 106, 108, 110, and 112 may be made of other materials, but is preferably of a relatively rigid, low cost, non-electrically conductive material, and generally is operable to shield the internal components from the external environment.

In one embodiment, the top and bottom walls 110 and 112 have an external surface 114, extending continuously from the first sidewall 106 to the second sidewall 108, that is flat and/or protrusion-free. In other words, the external surface 114 may be smooth without any connection ports or other apertures or protrusions. Advantageously, embodiments of the present invention are intended to provide a simple, non-bulky, sleek design and are intended as a stand-alone device that is not required to be connected to any other separate support devices in order to operate. In other words, users may simply plug-in the unitary wall outlet charging station 100 to the building wall outlet 700 without having to sacrifice accessibility to at least one wall outlet; yet at the same time being provided with the additional functionality of at least two charging cables and connectors thereon and without providing a visual eyesore or obstruction for the placement of furniture proximate the wall 702.

As used herein, the term "unitary," particularly when used in connection with the phrase "unitary wall outlet charging station," is intended to indicate that the charging station 100 is a singular unit that is configured to be removed, coupled to, and operate independently of any other devices or accessories to charge portable electronic devices (other than the wall outlet into which the charging station is plugged). To elaborate, the unitary wall outlet charging station 100 does not require a docketing unit or additional cables or connectors; once plugged-in to the wall outlet, the unitary wall outlet charging station 100 is self-sufficient, not requiring the user to locate or access any additional attachments, accessories, or cables in order to work, as with some existing charging stations. Similarly, the term "unitary," when used in connection with the phrase "unitary wall outlet plug body" is intended to indicate that the body 102 is a singular unit that is configured to be removed, coupled to, and operate independently of any other devices or accessories to charge portable electronic devices (other than the charging station 100 that it is a part of).

Referring now primarily to FIGS. 1, 4-5, and 7, in one embodiment, the unitary wall outlet plug body 102 is adapted to resemble a standard wall outlet faceplate 704. Standard wall-outlet faceplates 704 are generally known to the public (including those of ordinary skill in the art), because most residential and commercial units, homes, etc. have several in each room. Typically, a standard wall-outlet faceplate 704 has a rectangular shape and may have dimensions of, for example, 2.75 inches in width, 3.81 inches in length, and 0.25 inches in thickness. Accordingly, in one embodiment, the unitary wall outlet plug body 102 may have a similar rectangular shape and similar dimensions. Therefore, when desired for installation, the user would begin by removing the conventional face plate (typically by unscrewing one or more fasteners). Next, the user would plug in the one or more prongs 202 of the device 100 into the convention outlet(s) and fasten the plug body 102 to one or more locations on the junction box using, for example, an aperture 118 defined by the plug body 102, a fastener, and a receiving port for the fastener. As such, a safe and effective configuration is employed that many users find desirable and beneficial.

Figure 4:
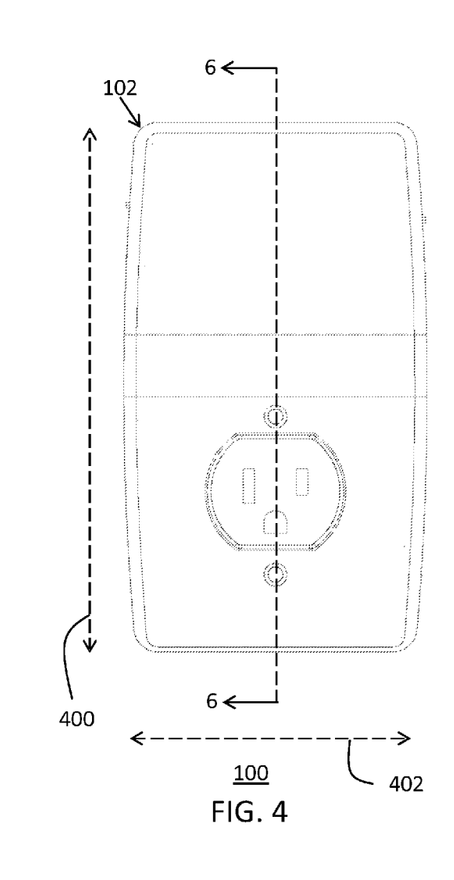
FIG. 4 is a front elevational view of the unitary wall outlet charging station of FIG. 1 in accordance with the present invention.
Figure 5:
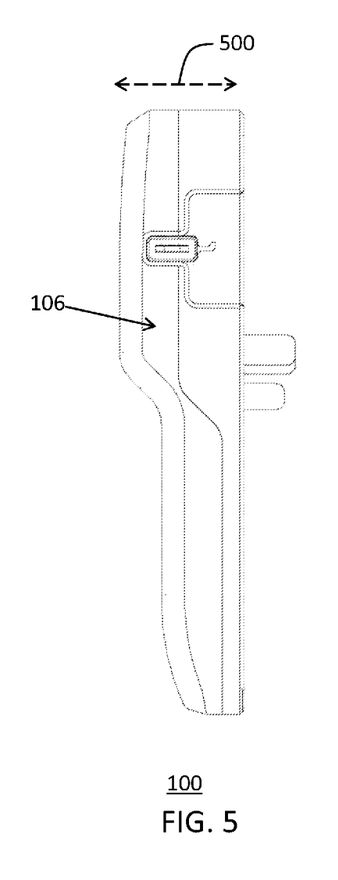
FIG. 5 is a side elevational view of the unitary wall outlet charging station of FIG. 1 in accordance with the present invention.

In another embodiment, while a length 400 and a width 402 may be sized the same or substantially the same as the standard wall-outlet faceplate 704 dimensions, a thickness 500 of the unitary wall outlet plug body 102 (not including the plug prongs extending therefrom) may be much thicker than the standard wall-outlet faceplate 704 (e.g., 1.13 inches, which is over four (4) times thicker than the standard wall-outlet faceplate 704) so as to house additional components therein. In other embodiments, the thickness 500 of the unitary wall outlet plug body 102 may be more or less than 1.13 inches. It is well-known that most consumers utilize power strips in order to increase the number of power outlets available. However, power outlets on a power strip are very close together. Accordingly, the inventive unitary wall outlet charging station 100 of the present invention would not work well on most power strips because it would most likely obstruct more than one power outlet on the power strip. This problem tends to teach away from constructing plug-in charging stations that directly plug-in to a power outlet with faceplate-type dimensions that would obstruct more than one power outlet on conventional power strips.

In yet other embodiments, the shape of the unitary wall outlet plug body 102 may be different and the length 400 and the width 402 may be more or less than the length and width of the standard wall-outlet faceplate 704. For example, in one embodiment, the unitary wall outlet plug body 102 may be sized and shaped so to conceal the standard wall outlet faceplate 704 disposed on the wall 702. More specifically, the unitary wall outlet plug body 102 may be sized and shaped so as to conceal the standard wall outlet faceplate 704 disposed on the wall 702 from a front view of a viewer when the unitary wall outlet plug body 102 is plugged into the wall outlet 702. In other embodiments, the body 102 may be shaped and sized to only cover the portion of the faceplate 704 in which one of the outlets 700 are located, thereby leaving the other outlet beneficially exposed and operable for use. In the exemplary embodiment, most clearly depicted in FIG. 7, the unitary wall outlet charging station 100 is shown plugged into the wall outlet 700 with a shape and dimensions that conceal the wall outlet 700 and the standard wall outlet faceplate 704 from external view. The profile of the wall outlet 700 and the standard wall outlet faceplate 704 is shown in dotted lines. In an exemplary embodiment, from the viewpoint of the viewer discussed herein above, the front wall 104 of the unitary wall outlet charging station 100 is shown with a rectangular-shape and may, for example, have dimensions of 3.15 inches in maximum width 402, 5.5 inches in maximum length 400, and 1.13 inches in maximum thickness 500. As used herein, the maximum thickness 500 is calculated without the inclusion of the plug prongs. In other embodiments, the shape and dimensions of the unitary wall outlet charging station 100 may vary from the exemplary embodiment depicted in FIG. 7. In one embodiment, the shape of the unitary wall outlet charging station 100 may, for example, be circular, oval-shaped, or may be an unconventional polygonal shape, such as a star-shape; but should preferably still be sized to conceal the wall outlet faceplate 704 when the charging station 100 is plugged into the wall outlet 700.

Describing in more detail the plug prongs mentioned herein above and referring now primarily to FIG. 2, in one embodiment, a set of wall outlet plugs 202 may extend outwardly from the rear wall 200. In the exemplary embodiment, the set of wall outlet plugs 202 includes a three (3) prong plug referred to as a Type B electrical outlet plug according to the U.S. Department of Commerce International Trade Administration (USDCITA), which is a standard power outlet plug in the United States of America, as is known generally in the art. In other embodiments, the set of wall outlet plugs 202 may be formed as a two-prong plug referred to as a Type B electrical outlet plug by the USDCITA, or other plugs configurations that may be standard in various different countries (e.g., Type C used commonly in Europe, Type D used commonly in India, Type E used commonly in France and other European countries, Type F used commonly in Russia, Types G through Type O, and the like.

Referring primarily to FIGS. 1 and 7, a wall outlet 116 is provided on the front wall 104 and is operably configured to selectively receive a second set of wall outlet plugs associated with an electrical device 706 for supplying power to the electrical device 706. The second set of wall outlet plugs may be of the same plug-type, shape, and/or configuration as the set of wall outlet plugs 202 on the unitary wall outlet charging station 100. In another embodiment, the wall outlet 116 provided on the front wall 104 of the unitary wall outlet charging station 100 is of the same type as the wall outlet 700 provided on the building wall 702. This is so that when the charging station 100 is plugged into the wall outlet 700 on the wall 702, the inventive charging station 100 is able to continue to provide access to at least one wall outlet 116, while charging portable electronic devices 708 and 710. In one embodiment, the unitary wall outlet charging station 100 includes an AC-to-DC converter in order to convert AC power to DC power. In an alternative embodiment, the unitary wall outlet charging station 100 may not include an AC-to-DC converter.

Figure 3:
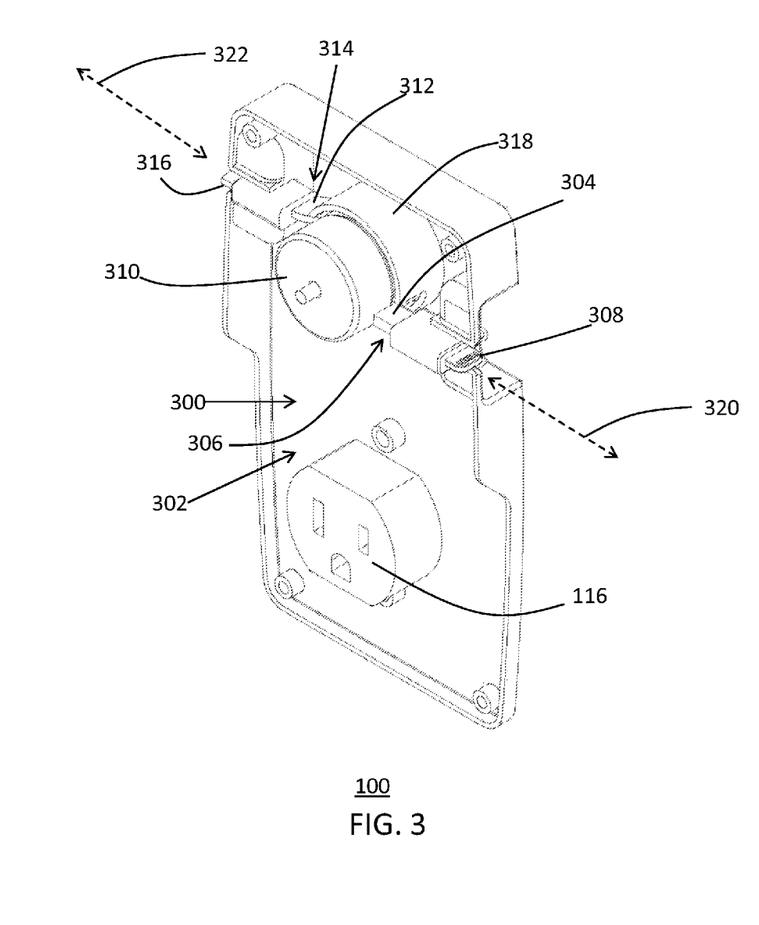
FIG. 3 is a fragmentary perspective view of the unitary wall outlet charging station of FIG. 1, with a front shell of the unitary wall outlet charging station removed so as to show the interior cavity, in accordance with an embodiment of the present invention.

Referring now primarily to FIG. 3, with brief reference to FIG. 7, in one embodiment, the unitary wall outlet charging station 100 includes a first retractable cable 304. The first retractable cable 304 can be any type of conductor, cable, cord, etc. operable to transmit power to charge a portable electronic device, such as a smartphone, tablet, laptop, music player, and the like. The first retractable cable 304 may include a first end 306 and a second end (not shown) with a length 712 extending from the first end 306 to the second end. As used herein, the term "end" is intended to indicate an absolute end, plus an additional 1-2 inches in length from the absolute end. In one embodiment, the length 712 of the first retractable cable 304 may be at least four (4) feet so that the portable electronic device 708 may be accessible to the user away from the wall 702 while the user is charging it. In a further embodiment, the length 712 of the first retractable cable 304 may be at least five (5) feet. In another embodiment, the cable length 712 may be configured such that a selectively adjustable distance 714 between the portable electronic device 708 and the unitary wall outlet charging station 100 is at least a maximum of three (3) feet. In other words, in such an embodiment, the length 712 may provide at least three (3) feet for the user to use the device 708 when plugged-in for charging. In other embodiments, the length 712 may be outside of these ranges.

In one embodiment, a first connector 308 may be coupled to the first end 306 of the first retractable cable 304. The first connector 308 is preferably formed as one of a Micro USB connector and a Lightning connector. In other embodiments, the first connector 308 may be formed as other connector types that are operable to charge the portable electronic device 708, such as, for example, a mini-USB connector, a coaxial connector, a D subminiature connector, and the like. As is known, there are a multitude of connector types for charging various portable electronic devices having various mechanical and electrical configurations. The present invention is intended to provide at least two (2) of such connector-cable types within a unitary structure so as to alleviate the problem of users not being able to charge their devices because they are not able to locate or have access to their particular required charging cable and connector-type.

In a retracted configuration thereof, an exemplary embodiment of which is shown in FIG. 3, the first retractable cable 304 is disposed at least partially within the cavity 302 so as to be visually concealed within the unitary wall outlet plug body 102. As used herein, the term "visually concealed" means entirely visually concealed or substantially visually concealed. As used herein, the phrase "retracted configuration" is intended to indicate a configuration of the respective retractable cable in which the retractable cable is retracted/withdrawn into the cavity 302 of the unitary wall outlet plug body 102 along a respective cable path (represented with arrows 320 and 322) for visual and physical concealment when the corresponding connector is not desired to be in use charging a device.

Alternatively, in an extended configuration along the respective cable path 320 or 322, an exemplary embodiment of which is shown in FIG. 7, the first retractable cable 304 is rotatably extended outwardly into an external environment 716 such that the first connector 308 is couplable to a charging port 718 of the first portable electronic device 708 at the selectively adjustable distance 714 from the respective sidewall 108. A rotation direction of the first retractable cable 304 in the extended configuration may be one of a clockwise and a counter-clockwise rotation direction. As used herein, the term "cable path" is intended to indicate a path that a respective retractable cable travels during retraction and/or extension thereof respective to the unitary wall outlet plug body 102.

In one embodiment, a first spool 310 is provided within the cavity 302 so as to implement the retractable functionality. As is known in the art, a spool may be considered a cylindrical device on which the retractable cable 304 may be wound and unwound. In other embodiments, the retractable functionality may be provided through other apparatuses and methods. The spool 310 may also include a locking or biasing mechanism to prevent the cable 304 from retracting when in the extended configuration and/or to facilitate in reeling the cable 304 into the cavity 302 when not desired for use.

Referring still primarily to FIG. 3, with brief reference to FIG. 7, a second retractable cable 312 will be described herein below. In one embodiment, the unitary wall outlet charging station 100 includes the second retractable cable 312 (which may be considered in some embodiments to be the same or substantially the same as the first retractable cable 304, except disposed and oriented differently). The second retractable cable 312 can be any type of conductor, cable, cord, etc. operable to transmit power to charge a portable electronic device, such as a smartphone, tablet, laptop, music player, and the like. The second retractable cable 312 may include a first end 314 and a second end (not shown) with a length 720 extending from the first end 314 to the second end. In one embodiment, the length 720 of the second retractable cable 312 may be at least four (4) feet so that the portable electronic device 710 may be accessible to the user away from the wall 702 while the user is charging it. In a further embodiment, the length 720 of the second retractable cable 312 may be at least five (5) feet. In another embodiment, the cable length 720 may be configured such that a selectively adjustable distance 722 between the portable electronic device 710 and the unitary wall outlet charging station 100 is at least a maximum of three (3) feet. In other words, in such an embodiment, the length 720 may provide at least three (3) feet for the user to use the device 710 when plugged-in for charging. In other embodiments, the length 720 may be outside of these ranges.

In one embodiment, a second connector 316 may be coupled to the first end 314 of the second retractable cable 312. The second connector 316 is preferably formed as one of a Micro USB connector and a Lightning connector. In other embodiments, the second connector 316 may be formed as other types of connectors that are operable to charge the portable electronic device 710, such as, for example, a mini-USB connector, a coaxial connector, a D subminiature connector, and the like. As is known, there are a multitude of connector types for charging various portable electronic devices having various mechanical and electrical configurations. The present invention is intended to provide at least two (2) of such connector-cable types within a unitary structure so as to alleviate the problem of users not being able to charge their devices because they are not able to locate or have access to their particular required charging cable and connector-type.

In a retracted configuration thereof, an exemplary embodiment of which is shown in FIG. 3, the second retractable cable 312 is disposed at least partially within the cavity 302 so as to be visually concealed within the unitary wall outlet plug body 102.

Alternatively, in an extended configuration thereof, an exemplary embodiment of which is shown in FIG. 7, the second retractable cable 312 is rotatably extended outwardly into the external environment 716 such that the second connector 316 is couplable to a charging port 724 of the second portable electronic device 710 at the selectively adjustable distance 722 from the respective sidewall 106. A rotation direction of the second retractable cable 312 in the extended configuration may be one of a clockwise and a counter-clockwise rotation direction.

Figure 8:
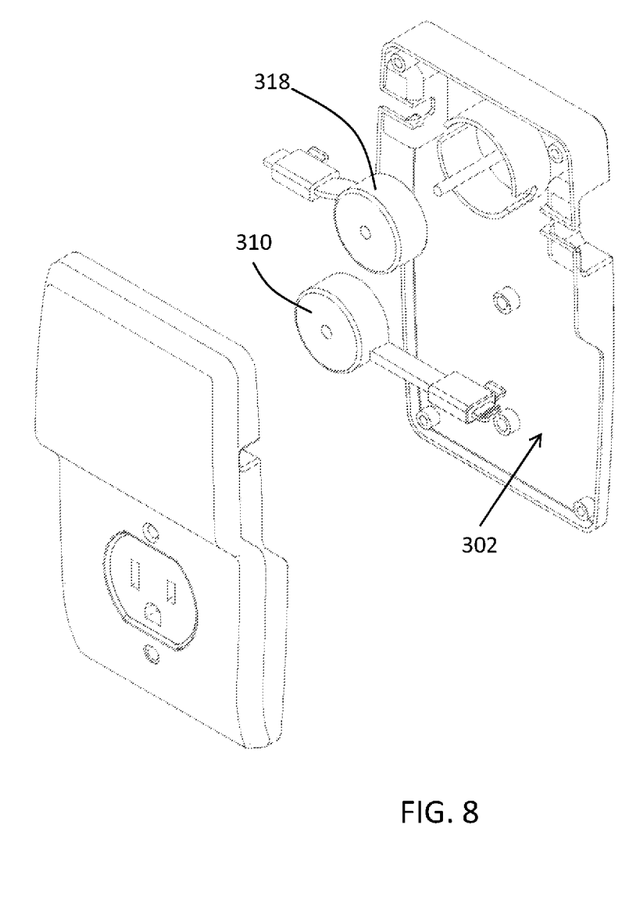
FIG. 8 is a perspective view of a second spool relative to a first spool within a cavity of the unitary wall outlet charging station in accordance with one embodiment of the present invention.

In one embodiment, a second spool 318 is provided within the cavity 302 so as to implement the retractable functionality of the second retractable cable 312. As is known in the art, a spool may be considered a cylindrical device on which the retractable cable 312 may be wound and unwound. In other embodiments, the retractable functionality may be provided through other apparatuses and methods. FIG. 8 illustrates an exemplary disposition of the second spool 318 relative to the first spool 310 within the cavity 302, in an expanded perspective view of the unitary wall outlet charging station 100.

In one embodiment, the second connector 316 is of a different connector-type than the first connector 308. In a preferred embodiment, the second connector 316 may be a Micro USB connector and the first connector 308 may be a Lightning connector. In yet another embodiment, the first and second retractable cables 304 and 312 are independently rotatable relative to one another so as to be independently selectable by the user to charge various devices. In a further embodiment, the first and second spools 310 and 318 may be considered a pair of spools and may also be co-axial spools, with each independently rotatable relative to one another about an axis 601 (see FIG. 6) perpendicular to the building wall 702 when the unitary wall outlet plug body 102 is plugged into the wall outlet 700 disposed on the building wall 702.

Referring now primarily to FIGS. 2-3, with reference to FIG. 7, in one embodiment, the first sidewall 106 defines a first sidewall aperture 204. The first sidewall aperture 204 provides an exit/entry opening through which the first retractable cable 304 may extend outwardly from the external environment 716, during the extended configuration, and, may retract inwardly from the external environment 716 into the cavity 302, during the retracted configuration.

In one embodiment, the first sidewall 106 defines a first sidewall recess 206. In another embodiment, the first sidewall recess 206 may be sized so that at least a portion of the first connector 308 may be disposed within the first sidewall recess 206 in the retracted configuration thereof. As used herein, the term "sidewall recess" is intended to indicate a space provided by a sidewall that is set further back from the rest of the sidewall. In a further embodiment, the first sidewall recess 206 is sized and shaped to receive at least one finger of the user so as to permit the user to grip the first connector 308 in order to apply a pulling force to outwardly extend the first retractable cable 304 in a first direction 726 parallel to the wall 702 when the unitary wall outlet plug body 102 is plugged into the wall outlet 700 disposed on the wall 702. As used herein, the term "parallel" is intended to mean parallel as well as substantially parallel. In other embodiments, the first sidewall recess 206 may be sized and shaped to receive two fingers of the user so as to permit the user to grip the first connector 308 in order to outwardly extend the first retractable cable 304. In yet another embodiment, the first sidewall 106 may be substantially planar/flat without a recess and may instead provide for at least a portion of the first connector 308 to protrude from the first sidewall 106, or, more specifically, to protrude outwardly beyond the maximum width 402 (see FIG. 4) of the unitary wall outlet plug body 102 during the retracted configuration.

Referring still primarily to FIGS. 2-3, with reference to FIG. 7, a second sidewall aperture 208 and a second sidewall recess 210 defined by the second sidewall 108 will be described herein below (and which may be considered in some embodiments to be the same or substantially the same as the first sidewall aperture 204 and the first sidewall recess 206, except disposed and oriented differently).

In one embodiment, the second sidewall aperture 208 provides an exit/entry opening through which the second retractable cable 312 may extend outwardly from the cavity 302 into the external environment 716, during the extended configuration, and, may retract inwardly from the external environment 716 into the cavity 302, during the retracted configuration.

In one embodiment, the second sidewall 108 defines the second sidewall recess 210. In another embodiment, the second sidewall recess 210 may be sized so that at least a portion of the second connector 316 may be disposed within the second sidewall recess 210 in the retracted configuration thereof. In a further embodiment, the second sidewall recess 210 is sized and shaped to receive at least one finger of the user so as to permit the user to grip the second connector 316 in order to apply a pulling force to outwardly extend the second retractable cable 312 in a second direction 728 parallel to the wall 702 when the unitary wall outlet plug body 102 is plugged into the wall outlet 700 disposed on the wall 702. In other embodiments, the second sidewall recess 210 may be sized and shaped to receive two fingers of the user so as to permit the user to grip the second connector 316 in order to outwardly extend the second retractable cable 312. In yet another embodiment, the second sidewall 108 may be substantially planar/flat without a recess and may instead provide for at least a portion of the second connector 316 to protrude from the second sidewall 108, or, more specifically, to protrude outwardly beyond the maximum width 402 (see FIG. 4) of the unitary wall outlet plug body 102 during the retracted configuration. In one embodiment, the first direction 726 is opposite the second direction 728.

Although a mirror-image-type configuration is depicted in the exemplary embodiment (see for example FIG. 7) for the retractable cables and connectors (including the recesses and apertures described herein above), it is understood that some embodiments may not be an exact mirror image on each side of the unitary wall outlet charging station 100. For example, some embodiments may have differently shaped recesses on each side, or differently sized apertures. In yet other embodiments, the retractable cables 304 and 312 may be extendable in directions that are not opposite directions from one another. In yet other embodiments, additional connectors, cables, ports and the like may be provided on the unitary wall outlet charging station 100.

Figure 6:
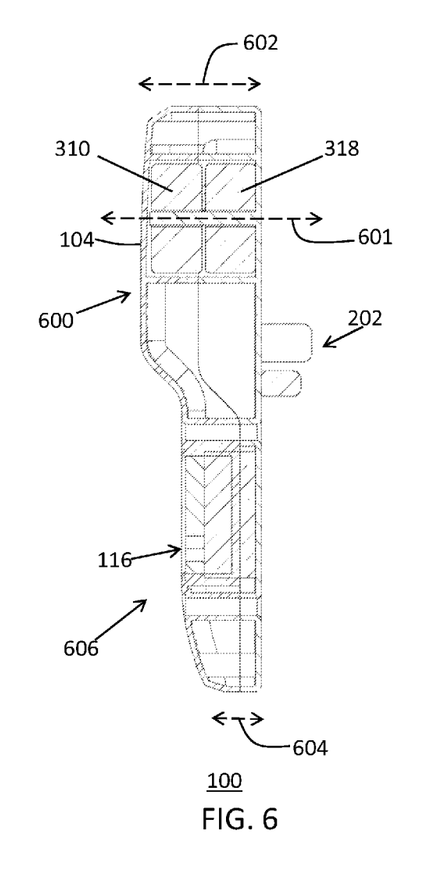
FIG. 6 is a cross-sectional side elevational view of the unitary wall outlet charging station of FIG. 1, taken across line 6-6 in FIG. 4, in accordance with the present invention.

Referring now primarily to FIGS. 3, 5-6, in one embodiment, the unitary wall outlet plug body 102 may be of a non-uniform thickness. More specifically, in one embodiment, a first portion 600 of the unitary wall outlet plug body 102, in which the first and second retractable cables 304 and 312 are disposed, is of a greater thickness 602 than a thickness 604 of a second portion 606 of the unitary wall outlet plug body 102, in which the wall outlet 116 is disposed. The greater thickness 602 of the first portion 600 may be due, at least in-part, to the co-axial spools 310 and 318, which may be generally thicker than the wall outlet 116. Such an embodiment may provide for a less streamlined profile than a flat front face structure with a uniform thickness.

In one embodiment, the wall outlet 116 provided on the front wall 104 may be disposed in a non-overlapping arrangement relative to the set of wall outlet plugs 202. In other words, the set of wall outlet plugs 202 may be disposed vertically above or below the wall outlet 116, but not within the same horizontal plane. In one embodiment, the wall outlet 116 provided on the front wall 104 is the only wall outlet disposed on the unitary wall outlet charging station 100. Although other charging stations may attempt to provide an option for two wall outlets so as to correspond to the two wall outlets typically provided on the standard wall outlet faceplate 704 (FIG. 7), embodiments of the present invention may in fact reduce the functionality of the standard wall outlet faceplate 704 by providing only a single wall outlet 116 on the front wall 104. In such an embodiment, the co-axial spools 310 and 318 may occupy the first portion 600 of the unitary wall outlet plug body 102, which could have been occupied by a second wall outlet 116.

In one embodiment, the unitary wall outlet charging station 100 may be configured to be entirely supported by a single set of wall outlet plugs 202. This is contrary to some existing charging stations in which additional support structures are required to support the unit when plugged into a wall outlet. In a further embodiment, the unitary wall outlet plug body 102, the first retractable cable 304, the first connector 308, the second retractable cable 312, the second connector 316, the spools 310 and 318, and any additional electrical (e.g., power converters) and mechanical support elements (e.g., fasteners) disposed on and within the unitary wall outlet plug body 102 together define a charging station weight that is configured to be sufficient to be retained, without any other support forces, on the wall 702 solely by the set of wall outlet plugs 202, when the unitary wall outlet plug body 102 is plugged into the wall outlet 700 disposed on the building wall 702. Advantageously, preferred embodiments of the present invention are configured so as to not require any such additional support structures in order to retain the unitary wall outlet charging station 100 on the wall, other than the set of wall outlet plugs 202. In alternative embodiments, the unitary wall outlet charging station 100 may include additional support structures.

A novel and efficient unitary wall outlet charging station has been disclosed. Embodiments of the present invention provide a unitary wall outlet plug body having a set of wall outlet plugs extending outwardly from a rear face of the body so as to be removeably plugged into a wall outlet disposed on a building wall and a wall outlet disposed on the front face of the body so as to be operable to receive a set of wall outlet plugs from a power cord of an electronic device. In addition, embodiments of the invention provide for the unitary wall outlet charging station to include a pair of retractable charging cables and connectors for charging portable electronic devices at a selectively adjustable distance from the building wall outlet. In other embodiments, the unitary unitary wall outlet plug body is shaped to resemble a standard wall outlet face plate so as to visually blend into the existing wall layout without giving the appearance of an eyesore. In other words, in some embodiments, when the inventive unitary wall outlet charging station is coupled to the wall outlet of the building wall, it generally gives the appearance of a conventional wall outlet and does not take up a large amount of additional space proximate the wall so as to not obstruct placement of furniture disposed proximate the wall.

What is claimed is:

1. A unitary wall outlet charging station for charging portable electronic devices comprising:
   a unitary wall outlet plug body operably configured to be removeably plugged into a wall outlet disposed on a building wall, the unitary wall outlet plug body having:
   a front wall;
   a rear wall opposite the front wall;
   a first sidewall separating the front wall from the rear wall and defining a first sidewall aperture;
   a second sidewall opposite the first sidewall, separating the front wall from the rear wall, and defining a second sidewall aperture;
   an inner surface of each of the front wall, the rear wall, the first sidewall, and the second sidewall defining a cavity;
   a set of wall outlet plugs extending outwardly from the rear wall; and
   a wall outlet provided on the front wall and operably configured to selectively receive a second set of wall outlet plugs associated with an electrical device for supplying power to the electrical device; and
   a first retractable cable having:
   a first connector coupled to an end of the first retractable cable;
   a retracted configuration along a first cable path with the first retractable cable disposed within the cavity so as to be visually concealed within the unitary wall outlet plug body and the first connector protruding from the first sidewall and outwardly away from the cavity; and
   an extended configuration along the first cable path with the first retractable cable rotatably extended outwardly, at a selectively adjustable distance from the first sidewall, into an external environment through the first sidewall aperture such that the first connector is couplable to a charging port of a first portable electronic device; and a second retractable cable having:
a second connector coupled to an end of the second retractable cable;
a retracted configuration along a second cable path with the second retractable cable disposed within the cavity so as to be visually concealed within the unitary wall outlet plug body and the second connector protruding from the second sidewall and outwardly away from the cavity; and
an extended configuration along the second cable path with the second retractable cable rotatably extended outwardly, at a selectively adjustable distance from the second sidewall, into an external environment through the second sidewall aperture such that the second connector is couplable to a charging port of a second portable electronic device,
the unitary wall outlet plug body is of a non-uniform thickness spanning from the front wall of the wall outlet body to a rear wall of the wall outlet body and has a first portion in which the first and second retractable cables are disposed that has greater than 50% of its length, spanning in a direction from a top wall of the outlet body to a bottom wall of the wall outlet body, of a thickness greater than a thickness of a second portion of the unitary wall outlet plug body spanning in a direction from the top wall of the outlet body to the bottom wall of the wall outlet body in which the wall outlet provided on the front wall is disposed, the first and second portions of the wall outlet body integrally coupled with one another.

2. The unitary wall outlet charging station in accordance with claim 1, wherein:
the second connector is of a different connector type than the first connector.

3. The unitary wall outlet charging station in accordance with claim 1, wherein:
each of the first and second retractable cables have a cable length that is at least four (4) feet; and
each of the first and second retractable cables are independently rotatable relative to one another.

4. The unitary wall outlet charging station in accordance with claim 1, wherein:
the first sidewall defines a first sidewall recess within which at least a portion of the first connector is disposed in the retracted configuration of the first retractable cable; and
the second sidewall defines a second sidewall recess within which at least a portion of the second connector is disposed in the retracted configuration of the second retractable cable.

5. The unitary wall outlet charging station in accordance with claim 4, wherein:
the first sidewall recess is sized and shaped to receive at least one finger of a user so as to permit the user to grip the first connector to outwardly extend the first retractable cable in a first direction parallel to the wall when the unitary wall outlet plug body is plugged into the wall outlet disposed on the building wall; and
the second sidewall recess is sized and shaped to receive at least one finger of the user so as to permit the user to grip the second connector to outwardly extend the second retractable cable in a second direction parallel to the wall when the unitary wall outlet plug body is plugged into the wall outlet disposed on the building wall, the second direction opposite the first direction.

6. The unitary wall outlet charging station in accordance with claim 1, wherein:
the wall outlet provided on the front wall is the only wall outlet disposed on the unitary wall outlet charging station.

7. The unitary wall outlet charging station in accordance with claim 1, further comprising:
a pair of co-axial spools each independently rotatable relative to one another about an axis perpendicular to the wall when the unitary wall outlet plug body is plugged into the wall outlet disposed on the wall of the building; and
each of the pair of co-axial spools disposed to receive a respective one of the first and second retractable cables thereon.

8. The unitary wall outlet charging station in accordance with claim 1, wherein:
the unitary wall outlet plug body is adapted to resemble a standard wall outlet face plate.

9. The unitary wall outlet charging station in accordance with claim 1, wherein:
the unitary wall outlet plug body is sized and shaped so as to conceal a standard wall outlet face plate disposed on the front wall from a front view of a viewer when the unitary wall outlet plug body is plugged into the wall outlet disposed on the building wall.

10. The unitary wall outlet charging station in accordance with claim 1, wherein:
the unitary wall outlet plug body further includes:
a top wall separating the first sidewall from the second sidewall; and
a bottom wall opposite the top wall and separating the first sidewall from the second sidewall, the top and bottom walls having a flat, protrusion-free external surface extending continuously from the first sidewall to the second sidewall.

11. The unitary wall outlet charging station in accordance with claim 1, wherein:
the unitary wall outlet plug body, the first retractable cable, the first connector, the second retractable cable, the second connector, and all of the electrical and mechanical support elements disposed on and within the unitary wall outlet plug body together defines a charging station weight that is configured to be sufficient to be retained, without any other support forces, on the wall solely by the set of wall outlet plugs when the unitary wall outlet plug body is plugged into the wall outlet disposed on the building wall.

12. A unitary wall outlet charging station comprising:
a unitary wall outlet plug body operably configured to be removeably plugged into a wall outlet disposed on a building wall, the unitary wall outlet plug body having:
a front wall;
a rear wall opposite the front wall;
a first sidewall separating the front wall from the rear wall and defining a first sidewall aperture;
a second sidewall opposite the first sidewall, separating the front wall from the rear wall, and defining a second sidewall aperture;
an inner surface of each of the front wall, the rear wall, the first sidewall, and the second sidewall defining a cavity;
a set of wall outlet plugs extending outwardly from the rear wall; and
a wall outlet provided on the front wall and operably configured to selectively receive a second set of wall outlet plugs associated with an electrical device for supplying power to the electrical device; and a pair of retractable cables:
  that are independently rotatable relative to one another;
  each having a connector coupled to an end thereof;
  each disposed within the cavity in a retracted configuration thereof and at least a portion of the respective retractable cable disposed in an external environment in an extended configuration thereof, the retracted configuration including the first connector protruding from the first sidewall and outwardly away from the cavity and the second connector protruding from the second sidewall and outwardly away from the cavity;
  each rotatably extendable into the external environment through one of the first and second sidewall apertures such that the respective connector is couplable to a mating charging port of a portable electronic device at a selectively adjustable distance from the unitary wall outlet plug body; and
  each having a cable length configured such that the respective selectively adjustable distance is at least three (3) feet,
the unitary wall outlet plug body is of a non-uniform thickness spanning from the front wall of the wall outlet body to a rear wall of the wall outlet body and has a first portion in which the first and second retractable cables are disposed that has greater than 50% of its length, spanning in a direction from a top wall of the outlet body to a bottom wall of the wall outlet body, of a thickness greater than a thickness of a second portion of the unitary wall outlet plug body spanning in a direction from the top wall of the outlet body to the bottom wall of the wall outlet body in which the wall outlet provided on the front wall is disposed, the first and second portions of the wall outlet body integrally coupled with one another.

13. The unitary wall outlet charging station in accordance with claim 12, wherein:
  the connector coupled to each of the pair of retractable cables is of a connector type different than a connector type of the other.

14. The unitary wall outlet charging station in accordance with claim 12, wherein:
  each of the first and second sidewalls defines a sidewall recess within which at least a portion of the respective connector coupled to the respective retractable cable is disposed in the respective retracted configuration.

15. The unitary wall outlet charging station in accordance with claim 12, wherein:
  the wall outlet provided on the front wall is the only wall outlet disposed on the unitary wall outlet charging station.

16. The unitary wall outlet charging station in accordance with claim 12, further comprising:
  a pair of co-axial spools each independently rotatable relative to one another about an axis perpendicular to the building wall when the unitary wall outlet plug body is plugged into the wall outlet disposed on the building wall.

17. The unitary wall outlet charging station in accordance with claim 12, wherein:
  the unitary wall outlet plug body is adapted to resemble a standard wall outlet face plate; and
  the unitary wall outlet plug body is sized and shaped so as to conceal the standard wall outlet face plate disposed on the front wall a front view of a viewer when the unitary wall outlet plug body is plugged into the wall outlet disposed on the building wall.

18. The unitary wall outlet charging station in accordance with claim 12, wherein:
  the unitary wall outlet plug body further includes:
    a top wall separating the first sidewall from the second sidewall; and
    a bottom wall opposite the top wall and separating the first sidewall from the second sidewall, the top and bottom walls having a flat, protrusion-free external surface extending continuously from the first sidewall to the second sidewall.

19. A unitary wall outlet charging station for charging portable electronic devices comprising:
  a unitary wall outlet plug body operably configured to be removeably plugged into a wall outlet disposed on a building wall, the unitary wall outlet plug body having:
    a front wall;
    a rear wall opposite the front wall;
    a first sidewall separating the front wall from the rear wall and defining a first sidewall aperture;
    a second sidewall opposite the first sidewall, separating the front wall from the rear wall, and defining a second sidewall aperture;
    an inner surface of each of the front wall, the rear wall, the first sidewall, and the second sidewall defining a cavity;
    a set of wall outlet plugs extending outwardly from the rear wall; and
    a wall outlet provided on the front wall and operably configured to selectively receive a second set of wall outlet plugs associated with an electrical device for supplying power to the electrical device; and
  a first retractable cable having:
    a first connector coupled to an end of the first retractable cable;
    a retracted configuration along a first cable path with the first retractable cable disposed within the cavity so as to be visually concealed within the unitary wall outlet plug body; and
    an extended configuration along the first cable path with the first retractable cable rotatably extended outwardly, at a selectively adjustable distance from the first sidewall, into an external environment through the first sidewall aperture such that the first connector is couplable to a charging port of a first portable electronic device; and
  a second retractable cable having:
    a second connector coupled to an end of the second retractable cable;
    a retracted configuration along a second cable path with the second retractable cable disposed within the cavity so as to be visually concealed within the unitary wall outlet plug body; and
    an extended configuration along the second cable path with the second retractable cable rotatably extended outwardly, at a selectively adjustable distance from the second sidewall, into an external environment through the second sidewall aperture such that the second connector is couplable to a charging port of a second portable electronic device,
the unitary wall outlet plug body is of a non-uniform thickness spanning from the front wall of the wall outlet body to a rear wall of the wall outlet body and has a first portion in which the first and second retractable cables are disposed that has greater than 50% of its length, spanning in a direction from a top wall of the outlet body to a bottom wall of the wall outlet body, of a thickness greater than a thickness of a second portion of the unitary wall outlet plug body spanning in a direction from the top wall of the outlet body to the bottom wall of the wall outlet body in which the wall outlet provided on the front wall is disposed, the first and second portions of the wall outlet body integrally coupled with one another.

* * * * *